United States Patent

[11] 3,600,833

| [72] | Inventor | George W. Hartzell |
| | | Piqua, Ohio |
| [21] | Appl. No. | 715,678 |
| [22] | Filed | Mar. 25, 1968 |
| [45] | Patented | Aug. 24, 1971 |
| [73] | Assignee | Hartzell Industries, Inc. |
| | | Piqua, Ohio |

[54] CARRIAGE GUIDED WHEEL AND RAIL ASSEMBLY
9 Claims, 6 Drawing Figs.

[52] U.S. Cl. .................................................. 37/194,
104/154, 105/160.5, 143/47, 238/134, 295/1,
312/339, 104/242, 104/279, 105/218, 143/105,
143/108
[51] Int. Cl. ..................................................... B27g 19/00,
B60b 17/00, B61f 19/00
[50] Field of Search........................................... 104/154,
242, 243, 245, 246, 247, 248, 279, 280; 105/141,
144, 145, 154, 178, 215, 216, 217, 160.5, 218;
143/47–4, 105, 47, 108; 312/339; 37/194;
238/134; 295/1

[56] References Cited
UNITED STATES PATENTS

| 54,975 | 5/1866 | Straight .................. | 105/216 X |
| 390,267 | 10/1888 | Thompson ............... | 105/216 X |
| 1,045,523 | 11/1912 | Cossey .................... | 312/339 |
| 2,915,019 | 12/1959 | Tieman .................... | 104/279 |
| 3,027,091 | 3/1962 | Small et al. .............. | 104/247 X |
| 3,280,934 | 10/1966 | De Biasi .................. | 104/154 X |
| 2,988,833 | 6/1961 | Preston, Sr. .............. | 143/105 X |
| 3,008,424 | 11/1961 | Roth ........................ | 418/177 |

*Primary Examiner*—Arthur L. La Point
*Assistant Examiner*—Howard Beltran
*Attorney*—Dybvig and Dybvig

ABSTRACT: A self-propelled vehicle operating on a two rail track to receive a log at one portion of the track and to reciprocate the log through a cutting saw at another portion of the track.

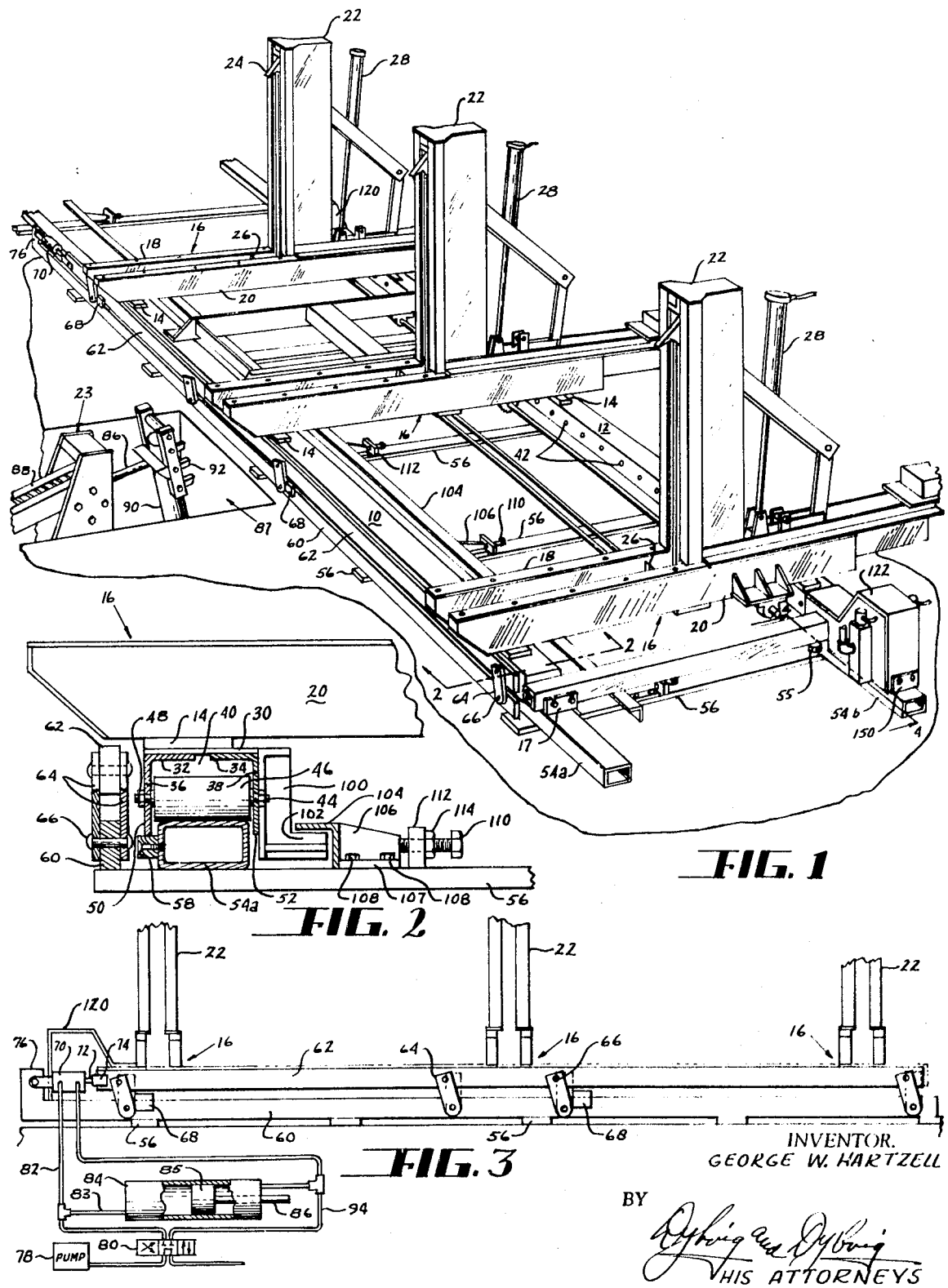

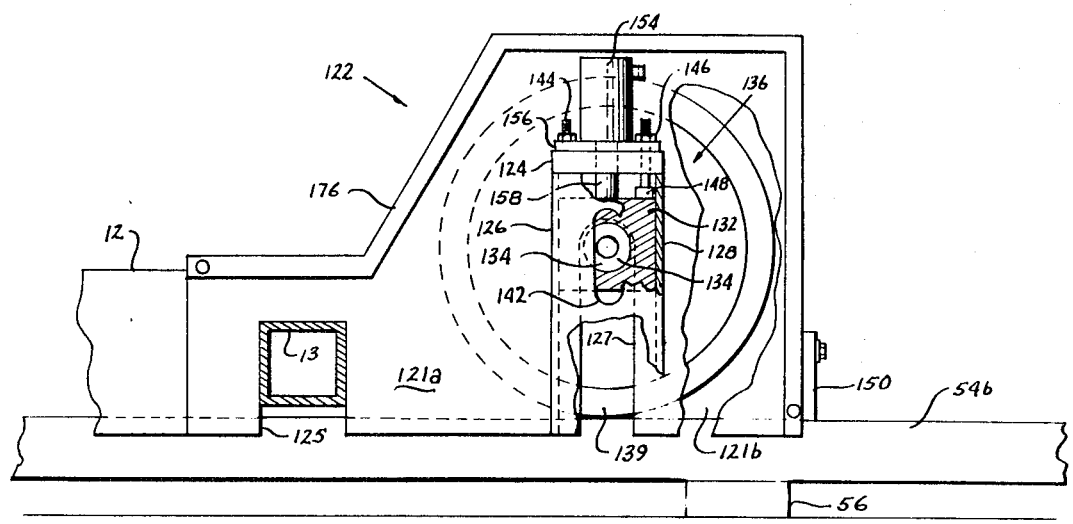
FIG. 4
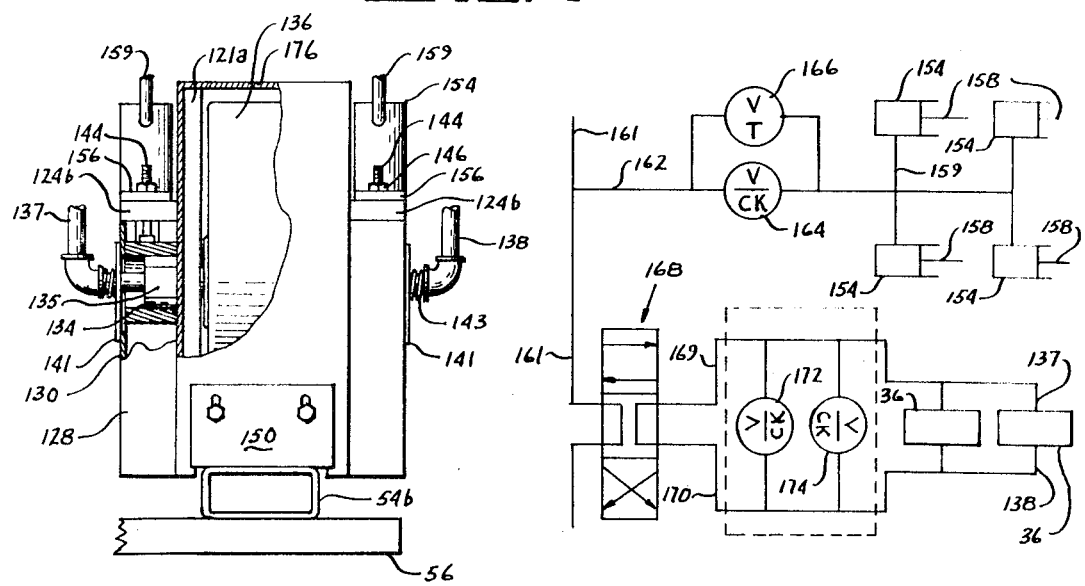
FIG. 5
FIG. 6
INVENTOR.
GEORGE W. HARTZELL
BY
HIS ATTORNEYS

CARRIAGE GUIDED WHEEL AND RAIL ASSEMBLY

This invention relates to an improved assembly of a log carriage with rails, and more particularly to an assembly which includes a self-propelled hydraulically powered log carrier operating on broad surface rails, and means to protect the rails from impact damage and from sawdust deposition; however, the invention is not necessarily so limited.

In a typical sawmill operation, a log is mounted on a log carriage which is reciprocated on rails past a vertically disposed saw. As the carriage is reciprocated the log is also advanced incrementally to one side of the carriage so as to present successive portions of the log to the cutting edge of the saw.

An object of the present invention is to provide an improved log carriage assembly.

Another object of the present invention is to provide a self-propelled log carriage for such assembly.

A further object of the present invention is to improve the rolling structure for a log carriage.

Another object of the present invention is to provide an improved log carriage assembly in which the accumulation of sawdust on the rails for the log carriage is minimized.

A further object of the invention is to provide a jacking mechanism to shield the rolling structure and rails of the log carriage assembly from impact damage.

A still further object of the present invention is to provide a traction drive for a log carriage including means to adjust the degree of traction in relation to the load to be moved.

Other objects and advantages reside in the construction of parts, the combination thereof, the method of manufacture and the mode of operation, as will become more apparent from the following description.

In the drawings,

FIG. 1 is a fragmentary perspective view illustrating a log carriage and rail assembly, which embodies the present invention, in operative relation to a log turner.

FIG. 2 is an enlarged fragmentary section view taken along the lines 2—2 of FIG. 1.

FIG. 3 is a fragmentary side elevation view of the log carriage assembly, this Figure schematically illustrating a hydraulic interconnection between the log turner and a jack mechanism for the log carriage.

FIG. 4 is an enlarged fragmentary section view taken along the lines 4—4 of FIG. 1, with portions broken away to illustrate a traction drive wheel and its housing.

FIG. 5 is an end elevation view with portions broken away of the traction drive wheel and housing of FIG. 4.

FIG. 6 is a schematic illustration of a hydraulic circuit associated with the traction drive wheel of FIGS. 4 and 5.

Referring to the drawings in greater detail, the log carriage is assembled upon elongate horizontally disposed channel members 10 and 12. The channel members are joined at their ends by transversely disposed tubular rods 13 welded thereto. Only one of the rods 13 appears in the drawings. Also welded to the channel members 10 and 12 are spaced pads 14 which provide supports for transversely extending head block assemblies 16.

There are three headblock assemblies 16 welded to and resting upon the pads 14. Each of the headblock assemblies 16 includes spaced parallel beams 18 and 20 which cooperate to slidably support an upstanding stanchion 22.

The stanchions 22 are part of a superstructure which functions to support a log on the carriage for presentation to the saw which cuts the log. To accomplish its function, the log carriage superstructure is used in conjunction with a loading device, not shown, which rolls a log onto the head block assemblies 16 from the left side of the log carriage, as viewed in FIG. 1; and a log turner shown generally at 23 with which an operator jostles the log into a desired position adjacent the stanchions 22. As the log is being positioned, hydraulic motors 28 are operated to move dogs 24 and 26 associated with the stanchions 22 to securely grip the log. After the log has been gripped, additional hydraulic motors, not shown, are used to incrementally advance the stanchions 22 to the left, as viewed in FIG. 1, to permit successive portions of the log to be sawed away.

Various parts of the superstructure not essential to a full description of the present invention have been omitted from the drawings so as not to obscure the structural features of the carriage chassis upon which the superstructure is assembled.

The channel members 10 and 12, upon which the head block assemblies 16 are assembled, are of substantially identical construction and accordingly only the channel member 10 is illustrated in detail. As best appears in FIG. 2, the channel member 10 comprises an elongate plate or web 30 which extends the length of the log carriage. Welded to the underside of the plate 30 are confronting angle bars 32 and 34 which also extend substantially the length of the log carriage.

The angle bars 32 and 34 each have one long side and one short side. The short sides are welded in face contacting relation to the plate 30. The long sides, 36 and 38, respectively, depend from the plate 30 and have outer faces which are coplanar with the side margins of the plate 30. The long sides thus cooperate with the plate 30 to define a deep pocket or channel 40 at the underside of the plate 30.

The channel member 10 has been assembled from the several pieces 30, 32 and 34 to obtain a desired channel depth with commercially available structural elements. It is to be recognized, however, that, depending upon the size of log carrier desired and the commercial availability of suitable structural elements, the channel member 10 might be of one-piece construction or might be constructed of other structural elements than those illustrated in the drawing.

The long sides 36 and 38 of the angle bars are bored at intervals spaced along the length thereof to form holes 42. Each hole 42 in the side 36 confronts a transversely aligned hole 42 in the side 38. Seated in aligned pairs of the transversely aligned holes 42 are axles 44 which rotatably support rollers 46. The axles 44 are secured by suitable nuts 48 threadedly engaged to the opposite ends thereof. Preferably, ball bearings, not illustrated, mount the rollers 46 rotatably to the axles 44.

The spacing of the rollers 46 along the length of the channel member 10, and also of the channel member 12, depends primarily upon the load bearing strength of the rollers 46 in comparison to the contemplated loading of the log carriage. Thus, as larger and heavier logs are to be supported by the carriage, more of the rollers 46 will be required so as to reduce the portion of the load which will be carried by any given roller. In this respect, it will be noted that the load is carried primarily on the left side of the log carriage, as illustrated in FIG. 1, and accordingly more of the rollers 46 will be required in the channel member 10 than in the channel member 12. For convenience, more borings through the sidewalls of the channel members 10 and 12 are provided than may actually be used so as to enable an adjustment in the population of the rollers 46 depending upon the load requirements.

As appears in FIG. 2, the diameter of each roller 46 is substantially less than the depth of the channel 40 and the rollers 46 are recessed at a depth within the channel 40 which places the periphery of each roller 46 above the lowermost edges 50 and 52 of the respective long sides 36 and 38 of the angle bars.

The rollers 46 in the channel members 10 and 12 are adapted to roll upon rails 54a and 54b, each rail being a hollow tubular member of generally rectangular cross section. The rails 54a and 54b are wider than they are high to provide a broad load-bearing surface supported by sidewalls which are relatively short so as to not readily collapse. As appears in FIG. 2, the rollers 46 are cylinders of constant diameter throughout the length thereof and have an axial length exceeding the horizontal separation between said sidewalls of said rails with the result that the rollers bear uniformly against said load-bearing surfaces throughout the width of said surfaces. The rails are supported in spaced parallel relation by transverse ties 56. Guide rolls 55 mounted on the transverse rods 13 of the carriage engage the inner walls of the rails to prevent lateral movement of the carriage off the rails.

The drawings illustrate only a limited length of the rails 54a and 54b which ordinarily extend over a length which is five to 10 times the length of the log carriage. The rails permit the carriage to move from the loading position, illustrated in FIG. 1, rearwardly to a section, not shown, on which the carriage can be reciprocated past a saw blade. The ties 56 are spaced at suitable intervals throughout this length of the rails and may be anchored by any suitable means, not shown, to a supporting foundation.

The horizontal width of each rail is less than the horizontal width of the channel 40 in the overlying channel member 10 or 12, as the case may be. This permits the lowermost edges 50 and 52 of the long sides 36 and 38, respectively, of the angle bars 32 and 34 to project below the load bearing surface of the underlying rail. In its operation, the log carriage will be reciprocated along the rails 54a and 54b past a saw which removes successive portions of a log mounted on the carriage. In the sawing area, substantial amounts of sawdust are generated and the greatest portion of this sawdust drops to the supporting foundation for the rails 54a and 54b at the left side of the log carriage, as viewed in FIG. 1. The downward extension of the long sides 36 and 38 in the channel members 10 and 12 shields the rails from much of the sawdust generated by the log sawing operation.

To enhance this shielding effect, an outwardly projecting sealing strip 58 is attached to the left side of the rail 54a, thus closing the gap between the long side 36 of the channel member 10 and the left side of the rail 54a.

Further shielding of the rail 54a from sawdust is provided by enclosing the ends of the channel member 10 with plates 15 welded to each end of the channel member 10. The tubular rods 13 which are in turn welded over the plates 15 at each end of the channel member 10 support scrapers 17 (only one scraper 17 is shown), which brush loose sawdust from the rail 54a and also scrape sawdust that may have been mashed onto the rail by the rolling action of the rollers 46. A functionally similar scraper action is provided for the rail 54b and will subsequently be described with reference to traction drive wheels mounted on the ends of the channel member 12.

As previously mentioned, FIG. 1 illustrates the log carriage at the position in which a log is loaded onto the carriage by a loading device, not shown, which rolls the log onto the headblock assemblies 16 from the left side, as viewed in FIG. 1. After the log is loaded, the log turner, shown at 23, is operated to jostle the log to a suitable rotary position adjacent the stanchions 22.

As those skilled in the art are aware, the weight of the log when first loaded onto the log carriage may be several thousand pounds. As the log is jostled into position by the log turner, the log may deliver substantial impacts to the headblock assemblies. Such impacts may severely damage either the rollers 46 or the rails 54a and 54b, especially the rail 54a. To shield the rail 54a and the rollers which rest thereon from excessive shock forces as the log is being jostled into position, a jack assembly is provided to take the weight of the carriage off the rail 54a during operation of the log turner.

As best appears in FIG. 3, the jack assembly comprises a first horizontal bar 60 welded to the ties 56 which support the rails 54a and 54b. The bar 60 extends along the left side of the rail 54a, as viewed in FIG. 1. A second horizontal bar 62 is mounted above the first bar 60 by means of transverse links 64, pivotally engaged to the bars 60 and 62 by means of bolts 66. As shown in FIG. 2, links 64 are provided on both sides of the bars 60 and 62.

The links 64 permit the upper horizontal bar 62 to be raised and lowered with respect to the lower bar 60 but at all times maintain precise parallelism between the bars 60 and 62. Stop members 68 welded to the outermost side of the lower bar 60 limit the movements of the links 64. In the following description, this type of jack will be referred to as a parallelogram jack.

Referring to FIG. 3, the range of movement available to the bar 62 is between the full and broken line positions illustrated in the drawing. Further leftward movement of the upper bar 62 is prevented by the presence of a hydraulic actuator 70 having a piston rod 72 slidably keyed to the upper bar 62 by a bifurcated bracket 74. The opposite end of the actuator 70 is anchored to an upright arm 76 integral with the lower horizontal bar 60.

The actuator 70 is a bidirectionally powered actuator receiving power from a hydraulic pump 78. The flow of hydraulic fluid to the actuator 70 is regulated by a three-position valve 80. In the illustrated position of the valve 80, fluid delivered by the pump 78 is passed to a reservoir without doing any work against the actuator 70.

When the valve 80 is moved to the left, as viewed in FIG. 3, the fluid delivered by the pump 78 is delivered through conduit 82 to the left side of the actuator 70. This causes the actuator 70 to move the upper bar 62 to the right, as viewed in FIG. 3, causing the links 64 to pivot to their broken line positions illustrated in FIG. 3. This movement of the links 64 causes the upper bar 62 to rise against the undersides of the headblock assemblies 16 and to lift the left side of the log carriage a very short distance.

As the links 64 pivot to their broken line positions, they move slightly past the vertical and against the stop members 68. Since the links 64 move beyond a vertical position, the left side of the carriage has been permitted to drop down very slightly, creating a position of stability which permits the pressure applied to the left side of the actuator 70 to be removed without lowering the carriage.

At the same time the valve 80 is permitting hydraulic fluid to flow through the conduit 82 to the actuator 70, it also permits hydraulic fluid to flow through a conduit 83 to a cylinder 84 associated with the log turner. The cylinder 84 does not appear in FIG. 1 for the reason that it is covered by a housing 88. The cylinder 84 houses a piston 85 which drives a piston rod 86. The rod 86 laterally positions a housing 90. The housing 90 supports an assembly of teeth 92 which are used in jostling the log on the log carriage. The housing 90 is also raised and lowered by an additional hydraulic cylinder, not shown, which is mounted within the housing 90.

When the log turner is not in use, it is recessed in a well 87 which is adjacent the rail 54a at the log loading position. The log turner is illustrated in FIG. 1 in its recessed position.

The log turner is raised by supplying pressure to the aforementioned cylinder mounted in the housing 90. Before the log turner can be used to jostle logs, it is also necessary to pressurize the cylinder 84 to pivot the housing 90 toward the carriage. However, as appears in the schematic circuit diagram shown in FIG. 3, the cylinder 84 cannot be pressurized to laterally pivot the log turner without also pressurizing the actuator 70. Thus, the log turner cannot be operated to jostle a log until the log carriage has been lifted by operation of the actuator 70 so as to take the weight of the log carriage and any log thereon off the rail 54a.

As the log turner 23 is operated to jostle a log to a desired position on the log carriage, the housing 90 will be pivoted to and fro by periodically reversing the direction of flow of the hydraulic fluid through the conduit 82. Such reversal is accomplished by positioning the valve 80 to the right, as viewed in FIG. 3, in which position the fluid flows from the pump 78 through a conduit 94 to the right side of the actuator 70 as well as to the right side of the log turner cylinder 84. This reverse of fluid flow pulls the log turner away from the log carriage, and at the same time, retracts the piston rod 72 of the actuator 70. This retraction of the piston rod 72 does not cause the upper bar 62 to move to the left and thereby lower the log carriage because the bifurcated bracket 74 engaging the upper bar 62 only slidably engages the upper bar 62. Thus, the actuator 70 can be energized to move the upper bar 62 to the right, as viewed in FIG. 3, but is incapable of moving the upper bar to the left, as viewed in FIG. 3. In view of this construction, the log turner 23 may be moved to and fro at will once the log carriage has initially been lifted off the rail 54a without causing the log carriage to return its weight to the rail 54a. It will be noted of course that the total right-to-left travel available to the upper bar 62 is quite short and it is only necessary to make the furcations in the bifurcated bracket 74 longer than the left-to-right movement available to the upper bar 62 to assure that the bracket 74 will not disengage the bar 62.

In operating the log turner 23 there is some risk that one of the teeth 92 may engage the central headblock assembly 16, tending to drive the carriage to the right, as viewed in FIG. 1, and thereby tending to overturn the carriage. To prevent damage to the log carriage and the rails 54a and 54b, should this happenstance occur, a number of L-shaped brackets 100 are welded to the vertically disposed side 38 of the angle bar 34 in the channel member 10. The brackets 100 are disposed in spaced relation along the length of the channel member 10 and, as the log carriage is moved to its position adjacent the log turner 23, the outwardly projecting legs 102 of the brackets 100 move under an angle bar 104. The angle bar 104 extends horizontally a distance slightly greater than the length of the parallelogram jack mechanism.

The angle bar 104 is adjustable mounted to the ties 56 by means of anchor members 106 welded to the angle bar 104 at intervals along its length corresponding to the spacing between the ties 56. Each anchor member 106 rises vertically from a base plate 107 bolted to an underlying tie 56 with bolts 108. The base plates 107 have transversely elongated slots, not shown, which allow the angle bar 104 to be adjusted toward or away from the adjacent rail 54a.

Each of the anchor members 106 is butted against the end of an abutment bolt 110 threadedly engaged to a support 112 welded to the underlying tie 56. The bolt 110 is locked to a desired extension from the support 112 by a locknut 114.

The abutment bolts 110, there being one bolt mounted on each of the ties 56 spanned by the angle bar 104 position the angle bar 104 a predetermined distance from the adjacent rail 54a, whereupon the bolts 108 are tightened to fix the position of the anchor members 106 on the ties 56 and thereby fix the position of the angle bar 104.

The positioning of the angle bar 104 is quite critical since it is desired that the parallelogram jack mechanism raise the legs 102 of the brackets 100 closely to the horizontal flange of the angle bar 104. It is also desired that the vertical flange of the angle bar 104 be positioned as close as possible to the ends of the horizontal legs 102 so that the log turner 23 cannot slide the log carriage to the right, as viewed in FIG. 1, for any appreciable distance. At the same time, of course, there must be enough clearance between the angle bar 104 and the horizontally extending legs 102 of the brackets 100 to allow the log carriage to move freely alongside the angle bar 104 as the log carriage is moved to its position adjacent the log turner 23. The adjustable abutment bolts 110 allow the position of the angle bar 104 to be periodically adjusted, as may be required during use, due to strain or warpage of the log carriage assembly.

In the preceding remarks devices have been described which operate to take the weight of the log carriage off the rail 54a as the log turner 23 is used and which further operate to prevent the log turner from sliding the log carriage laterally on the rails or from overturning the log carriage. The positioning and operation of these devices is such that whenever the log turner 23 is operated, the left side of the log carriage, as viewed in FIG. 1, will be supported by the horizontal bar 62 engaging the underside of the headblock assemblies 16 and held down by the angle bar 104 engaging the brackets 100. Obviously a fairly substantial force will be required to disengage the log carriage from this supported position.

In the present invention, this force is supplied by two drive wheels located to the right side of the carriage, as viewed in FIG. 1, at the opposite ends thereof. These drive wheels are hydraulically driven wheels, having traction engagement with the rail 54b. One of the drive wheels is housed in a housing 122 appearing in FIG. 1. The other drive wheel is housed in a similarly constructed housing 120, best seen in FIG. 3. FIGS. 4, 5 and 6 further illustrate the drive wheels and the hydraulic circuitry employed in operating the drive wheels.

The hydraulic drive assemblies housed in the housings 120 and 122 are of substantially identical construction. In the following, only the housing 122 and the hydraulic wheel housed therein is described in detail, it being understood that the housing 120 and the wheel housed therein is constructed essentially the same as the housing 122. The housing 122 comprises an inner sideplate 121a welded in face contacting relation to the long side of the angle bar which forms the inside wall of the channel member 12. An outer sideplate 121b is welded in face contacting relation to the angle bar which forms the outer sidewall of the channel member 12. The two sideplates 121a and 121b, spaced apart a distance corresponding to the width of the channel member 12, define an interior space for the receipt of a hydraulic wheel 136.

As previously mentioned, the opposite ends of the log carriage have a tubular rod 13 welded to the ends of the channel members 10 and 12. To allow the inner plate 121a to be welded to the inner side of the channel member 12, this plate is notched, as illustrated at 125, to receive the rod 13. A need for a similar notch in the outer sideplate 121b is avoided by terminating the rod 13 flush with the outer sidewall of the channel member 12.

Each of the sideplates 121a and 121b has a vertical slot 127 therein to receive axles 134 of the hydraulic wheel 136. These slots open to the bottom margins of the plates 121a and 121b to allow removal and replacement of the hydraulic wheels, and extend upwardly slightly more than half the height of the housing 122.

The axle 134 which extends to the left of the hydraulic wheel, as viewed in FIG. 5, has its periphery cut flat at 135 for keying to a block 132 which slides between spaced vertical plates 126 and 128. The plates 126 and 128 are welded in edge contacting relation to the outside face of the plate 121a and are joined by a cover plate 130 welded to the outer edges of the plates 126 and 128. The plates 126, 128 and 130 thus cooperate to form a housing which slidably receives the block 132.

The cover plate 130 has a vertically disposed slot 142 therein which permits a hydraulic fluid line 137 connected to the axle 134 a limited sliding movement with respect to the cover plate 130. The slot 142 is covered by a washer 141 encircling the line 137. The washer 141 is pressed against the cover plate 130 by a spring 143.

While the foregoing description of the housing 122 has been confined to the construction appearing on the sideplate 121a, it is to be understood that the opposite sideplate 121b is similarly constructed to allow vertical sliding movement of an axle projecting outwardly from the opposite side of the hydraulic wheel 136. Thus, as shown in FIG. 5, the hydraulic line 137 projects from the left side of the hydraulic wheel and a similarly located line 138 projects outwardly from the right side of the hydraulic wheel. As will be more fully explained in the following, either of these lines may be used as an inlet for hydraulic fluid under pressure to produce a rotation of the hydraulic wheel 136, whereupon the other of these lines will serve as an outlet for returning the fluid to a reservoir.

The hydraulic wheel itself may comprise a conventional positive displacement hydraulic motor, a number of varieties of which are available on the market. As is understood by those skilled in the art, the motor is a rotary motor in which the wheel 136 comprises the rotary part of the motor and is journaled on the axle 134 which is part of the stationary part of the motor. An example of such motor construction is described in U.S. Pat. No. 3,008,424 issued to Donald L. Roth on Nov. 14, 1961. For the purposes of the present invention, it is preferred that the wheel 136 be encircled by a suitable resilient tire 139 which may be rubber or a synthetic substitute.

Vertical upward movement of the wheel 136 in the housing 122 is limited by means of abutment members 144 threadedly engaging wings 124a and 124b projecting laterally from each side of the housing. The wing 124a is welded to the plate 121a on one side of the housing. The wing 124b is similarly welded to the plate 121b on the opposite side of the housing. Preferably, the abutment members 144 each terminate with a rubber pad 148. The abutment members 144, there being two on each side of the housing 122, limit the upward movement of the wheel 136 by engaging the uppermost surfaces of the blocks 132 disposed on each side of the housing. It will be noted that the wings 124a and 124b cover the tops of the housings which receive the sliding blocks 132 on the opposite sides of the main housing 122.

During operation of the hydraulic wheels, the amount of traction available to move the carriage will be dependent in part upon the setting of the several abutment members 144.

As the abutment members 144 are lowered, the weight of the log carriage which is borne by the rail 54b will be shifted from the rollers 46 located in the channel member 12 to the hydraulic wheels 136 located at the opposite ends of the carriage. Thus, the forces producing traction between the wheels 136 and the rail 54b will be increased. In the preferred practice of the present invention, the abutment members 144 are set to give just sufficient traction to drive normal loads and then locked in position by locknuts 146.

To provide an automatic increase in the traction forces as may be required for heavier than normal loads, a hydraulic cylinder 154 is mounted on each of the wings 124a and 124b. The cylinders 154 each have laterally projecting flanges 156 secured to the abutment members 144 by means of the locking nuts 146.

The wings 124a and 124b are each apertured to pass a plunger or piston 158 so that the plunger 158 can act directly against the sliding block 132 thereunder. Hydraulic fluid to actuate the plunger 158 is supplied through conduits 159 entering the cylinders 154.

The manner in which the cylinders 154 are operated is illustrated in FIG. 6. A three position control valve 168, which may be series connected with the previously described control valve 80, receives fluid under pressure through the conduit 161. In its center position as shown, the control valve 168 passes the fluid directly to a reservoir. When the control valve 168 is moved downwardly, as viewed in FIG. 6, the fluid under pressure is conveyed through the conduit 169 to the hydraulic wheels 136 which exhaust the fluid through the conduit 170 to a reservoir. When the control valve 168 is moved upwardly, as viewed in FIG. 6, from its center position, the fluid flow is reversed with fluid under pressure flowing through the conduit 170 to the hydraulic wheels and the hydraulic wheels exhausting the fluid through the conduit 169.

It will be understood that with the valve 168 in its uppermost position, as viewed in FIG. 6, the log carriage will be driven by the wheels 136 in one direction and with the valve 168 in its lowermost position, the log carriage will be driven in the opposite direction.

If, when the carriage is moving in one of its directions, the valve 168 is suddenly shifted to reverse that direction, the momentum of the log carriage, which may be very great, will tend to drive the hydraulic wheels 136 in opposition to the pump 78 and this will tend to produce exceedingly high fluid pressures in whichever of the conduits 169 and 170 is in communication with the conduit 161. To protect the conduits 169 and 170 against excessive fluid pressures, oppositely acting spring-loaded check valves 172 and 174 are provided between the conduits. Should an excessive pressure develop in the conduit 169, the spring-loaded check valve 172 will yield to permit fluid to leak from the conduit 169 to the conduit 170. Correspondingly, should an excessive pressure develop in the conduit 170, the check valve 174 will yield to permit fluid to leak to the conduit 169.

When the control valve 168 is in its center position, the hydraulic fluid has a through pass to the reservoir through the valve 168 and develops only a nominal pressure in the conduit 161. When the valve 168 is in either its upward or downward position, however, the fluid must operate against the load imposed by the log carriage and the pressure in the conduit 161 will rise substantially. This pressure is relayed through the conduit 162 and a forward going check valve 164 to the several cylinders 154 located on the housings for the hydraulic wheels. Obviously, the greater the load imposed by the log carriage, the greater the pressure that must be developed in the conduit 161 and, accordingly, the greater the pressure that will be applied to the pistons 158 associated with the cylinders 154. Since the pistons 158 act downwardly on the hydraulic wheels 136, the tractive force between these wheels and the rail 54b will increase as the load imposed by the log carriage increases.

As previously noted, the abutment members 144 establish a minimum level of traction between the hydraulic wheels 136 and the rail 54b which is suitable for driving normal loads. The cylinders 154 become useful primarily for larger than normal loads to increase the traction between the wheels 136 and the rail 54b in proportion to the size of the load. As the load picks up momentum, and the pressure required to move the load drops, the fluid in the cylinders 154 returns slowly through the throttle valve 166.

To shield the hydraulic wheels 136 and the rails thereunder from sawdust generated by the log sawing operations to be performed with the carriage, the housings 120 and 122 are covered with sheet metal covers 176. Each of the covers 176 supports a scraper 150 which scrapes accumulated sawdust from the track 54b.

It was previously noted that the tires 139 are preferably of a resilient material such as rubber. One reason for this is that the tires 139 will tend to flatten against the track 54b, producing an area of contact with the rail 54b which increases in proportion to the load. This increased area of contact cooperates with the increased pressure supplied to the cylinders 154 to provide increasing traction between the wheels 136 and the rail 54b as the load increases.

As previously mentioned, the parallelogram jack mechanism illustrated in FIG. 3, while operated by the actuator 70 to lift the left side of the carriage, as viewed in FIG. 1, cannot be released by the actuator 70. In the practice of the present invention, the parallelogram jack mechanism is released by energizing the hydraulic wheels 136. For purposes of description, it is convenient to refer to the end of the log carriage which supports the wheel housing 122 as the front end of the log carriage, and the opposite end as the rear end. In positioning the carriage for receipt of a log, as illustrated in FIG. 1, the log carriage is driven in a forward direction to the position illustrated. After a log has been placed on the log carriage in this position and adjusted by operating the log turner 23, the left side of the log carriage will have been jacked up as a result of the operation of the log turner 23. To disengage the left side of the log carriage from the jack mechanism, the control valve 80 is first positioned to the right, as viewed in FIG. 3. This moves the piston rod 72 to the left, as viewed in FIG. 3, to allow the parallelogram jack mechanism to be lowered, as will be described. This also assures that the log turner will have been swung away from the log carriage so that the carriage can be moved without interference from the log turner. Thereafter, the hydraulic wheels 136 are energized to operate in the reverse direction, thus applying a traction force tending to back the carriage off the jack mechanism. The traction force to accomplish this must be sufficient to raise the load on the left side of the log carriage slightly as the links 64 in the jack mechanism pivot backwards through their vertical position, whereupon the upper bar 62 of the jack mechanism will fall downwardly away from the headblock assemblies 16, releasing the carriage for rearward movement away from the log-loading position.

In the preferred practice of the present invention, one or more hydraulic pumps and a hydraulic reservoir are mounted stationary at a convenient and preferably central location alongside one of the rails 54a or 54b. Hydraulic power is delivered to and returned from the log carriage through flexible tubing which is preferably suspended above the log carriage with a pantograph type support arrangement. Preferably one pump is used to supply hydraulic power to the wheels and a different pump accompanied by a separate set of tubing to the carriage is used to supply power to other hydraulically operated equipment such as the log turner and parallelogram jack mechanism off the carriage as well as the hydraulic motors associated with the stanchions 22 on the carriage. This two pump arrangement permits the drive wheels 136 to be operated without depleting the hydraulic power supply to other hydraulic devices used in association with the carriage. The control valve 80 which operates the log turner cylinder 84 and the parallelogram jack mechanism is mounted stationary at any convenient location. The control valve 168 which regulates the supply of hydraulic fluid to the wheels 136 is also mounted off the carriage.

In the foregoing description, a log carriage assembly has been described wherein a log may be loaded on the log carriage, the log jostled to a desired position on the carriage while one side of the carriage is jacked up to reduce impact loading on at least one rail, and then the log carriage driven reciprocally by means of a self-propelling hydraulic traction drive for presenting the log to a saw blade. By employing comparatively small rollers under the carriage, the roller mechanism is conveniently shielded from dust in the areas where accumulations of sawdust are the greatest problem. Also, by using relatively small rollers to carry the bulk of the load of the log and to distribute this load over a large number of contact points with the rails for the log carriage, relatively inexpensive tubular rails suffice for the assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The combination with parallel horizontally disposed tubular rails each having an upper surface bounded by longitudinal side margins of a vehicle comprising elongate channel members disposed in laterally spaced parallel relation, one channel member overlying each said rail and extending lengthwise along each said rail, each channel member having a horizontally disposed web extending the length thereof and confronting the underlying rail, each channel member having spaced vertically disposed sidewalls depending from said web, said sidewalls each extending horizontally substantially the length of the web from which they depend, said spaced sidewalls of each said channel member cooperating to define a horizontally extending channel under the web from which they depend, said spaced sidewalls straddling the rail underlying the web from which they depend, each said channel receiving a plurality of rollers disposed in spaced relation along the length thereof, axle means, one for each said roller, engaged to the sidewalls defining the channel in which said each roller is received and supporting said each roller for rotation about an axis transverse to the length of the channel receiving the same, said rollers being cylindrical and having rolling engagement with the side margins of the underlying rail, means at each end of each said channel member mounting a rail scraper, and a load-supporting superstructure overlying said channel members and spanning the space therebetween.

2. The combination of claim 1, in which said rails are hollow tubular members of rectangular cross section.

3. The combination of claim 2, in which said rails are defined by horizontal upper and lower surface portions and spaced vertically disposed side portions supporting said surface portions in spaced relation, the horizontal separation between said side portions exceeding the vertical extent of said side portions.

4. The combination of claim 3, including a guide member mounted to said vehicle adjacent one of the side portions of one of said rails, said guide member limiting veering of said vehicle to one side of said rails by contact with said adjacent side portion.

5. The combination of claim 3, including a horizontally extending sealing strip projecting outwardly from one side portion of one of said rails, said sealing strip adapted to slidably contact the lowermost edge of one sidewall of the channel member overlying said one rail upon passage of said vehicle over said sealing strip.

6. The combination according to claim 1, including a drive wheel, one of said means mounting a rail scraper constituting said drive wheel, said drive wheel having traction engagement with the rail underlying a channel member, and means to rotate said drive wheel.

7. The combination of claim 6, wherein said drive wheel is the rotatable part of a rotary hydraulic motor, said drive wheel encircling and journaled to a nonrotatable part of said motor, said means mounting said drive wheel including means slidably and nonrotatably mounting said nonrotatable part to said first channel member for limited vertical sliding movement relative to said first channel member, said combination including hydraulic piston means acting between said first channel member and said stationary part to bias said nonrotatable part downwardly toward said rail, said means to rotate said drive wheel including a source of hydraulic fluid under pressure, a first conduit to deliver hydraulic fluid from said source to said motor, a second conduit communicating between said first conduit and said hydraulic piston whereby the fluid pressure delivered to said piston is proportional to the fluid pressure delivered to said motor.

8. The combination with parallel horizontally disposed rails of a vehicle comprising elongate channel members disposed in laterally spaced relation, each rail comprising a hollow tubular member of rectangular cross section, each rail being defined by generally horizontal upper and lower surface portions and spaced vertically disposed side portions supporting said surface portions in spaced relation, the horizontal separation between said side portions exceeding the vertical extent of said side portions, one channel member overlying each said rail and extending lengthwise along said rail, each channel member having a horizontally disposed web extending the length thereof and confronting the underlying rail, each channel member having spaced vertically disposed sidewalls depending from said web, said sidewalls each extending horizontally substantially the length of the web from which they depend, said spaced sidewalls of each said channel member cooperating to define a horizontally extending channel under the web from which they depend, said spaced sidewalls straddling the rail underlying the web from which they depend, each said channel receiving a plurality of rollers disposed in spaced relation along the length thereof, axle means, one for each said roller, engaged to the sidewalls defining the channel in which each said roller is received and supporting each roller for rotation about an axis transverse to the length of the channel receiving the same, said rollers being cylindrical throughout an axial length exceeding the space between said side portions of the underlying rail and having rolling engagement with the upper surface portion of said underlying rail across substantially all of said space between said side portions, and a load-supporting superstructure overlying said channel members and spanning the space therebetween.

9. The combination with generally parallel horizontally disposed rails of a vehicle comprising elongate channel members disposed in laterally spaced relation, each rail being defined by horizontal upper and lower surface portions and spaced vertically disposed side portions supporting said surface portions in spaced relation, one channel member of said vehicle overlying each said rail and extending lengthwise along said rail, each channel member having spaced vertically disposed sidewalls, each channel member receiving a plurality of rollers disposed in spaced relation along the length thereof, axle means, one for each said roller, engaged to the sidewalls of the channel member in which each said roller is received and supporting each roller for rotation about an axis transverse to the length of the channel receiving the same, said rollers each being a cylinder of substantially constant diameter throughout an axial length exceeding the space between the side portions of the underlying rail, and having rolling engagement with the upper surface of said underlying rail across substantially all of said space between said side portions.